(12) United States Patent
Nashiki et al.

(10) Patent No.: US 8,048,512 B2
(45) Date of Patent: Nov. 1, 2011

(54) TRANSPARENT CONDUCTIVE LAMINATE AND TOUCH PANEL EQUIPPED WITH IT

(75) Inventors: Tomotake Nashiki, Ibaraki (JP); Hideo Sugawara, Ibaraki (JP); Hidetoshi Yoshitake, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 0 days.

(21) Appl. No.: 12/376,014

(22) PCT Filed: Jun. 7, 2007

(86) PCT No.: PCT/JP2007/061558
§ 371 (c)(1),
(2), (4) Date: Feb. 2, 2009

(87) PCT Pub. No.: WO2008/015840
PCT Pub. Date: Feb. 7, 2008

(65) Prior Publication Data
US 2010/0003502 A1 Jan. 7, 2010

(30) Foreign Application Priority Data
Aug. 3, 2006 (JP) .................................. 2006-212347

(51) Int. Cl.
*B32B 7/02* (2006.01)
(52) U.S. Cl. ........ 428/212; 428/220; 313/504; 313/506; 257/431; 257/449
(58) Field of Classification Search .................. 428/212, 428/690, 917, 220; 313/504, 506; 257/431, 257/449
See application file for complete search history.

(56) References Cited

U.S. PATENT DOCUMENTS

| 5,645,901 A * | 7/1997 | Fukuchi et al. ................. 428/1.4 |
| 6,399,222 B2 | 6/2002 | Arai et al. |
| 6,603,085 B2 | 8/2003 | Oya et al. |
| 6,611,090 B1 * | 8/2003 | Watanabe et al. ............. 313/461 |
| 6,665,029 B2 * | 12/2003 | Kondo et al. ................. 349/113 |
| 6,720,955 B2 | 4/2004 | Sugawara et al. |
| 7,190,354 B2 | 3/2007 | Tanaka et al. |
| 2001/0037935 A1 | 11/2001 | Oya et al. |
| 2002/0158853 A1 | 10/2002 | Sugawara et al. |
| 2003/0186040 A1 | 10/2003 | Oya |
| 2005/0237307 A1 | 10/2005 | Hieda et al. |
| 2006/0108050 A1 | 5/2006 | Satake et al. |
| 2008/0020202 A1 | 1/2008 | Nashiki et al. |
| 2008/0096013 A1 | 4/2008 | Nashiki et al. |

FOREIGN PATENT DOCUMENTS

| CN | 1253634 A | 5/2000 |
| CN | 1328656 A | 12/2001 |
| EP | 1016893 A1 | 7/2000 |
| EP | 1452556 A1 | 9/2004 |
| JP | 2-005308 A | 1/1990 |
| JP | 8-132554 A | 5/1996 |
| JP | 8-167726 A | 6/1996 |
| JP | 11-216794 A | 8/1999 |
| JP | 11286066 A | 10/1999 |
| JP | 2000-040896 A | 2/2000 |
| JP | 2002-073282 A | 3/2002 |
| JP | 2002-117724 A | 4/2002 |
| JP | 2002-326301 A | 11/2002 |
| JP | 2003-002985 A | 1/2003 |
| JP | 2003-094548 A | 4/2003 |
| JP | 2003-236969 A | 8/2003 |
| JP | 2003-320609 A | 11/2003 |
| JP | 2004-046728 A | 2/2004 |
| JP | 2004-170907 A | 6/2004 |
| JP | 2004-259256 A | 9/2004 |
| JP | 2004322380 A | 11/2004 |
| JP | 2006-139750 A | 6/2006 |
| JP | 2006-179274 A | 7/2006 |
| KR | 2001-0093732 A | 10/2001 |
| TW | 550598 B | 9/2003 |
| TW | 562736 B | 11/2003 |
| TW | 574515 | 2/2004 |
| WO | 00/20917 A1 | 4/2000 |
| WO | 03/000779 A1 | 1/2003 |
| WO | 2004/038464 A1 | 5/2004 |
| WO | 2004/070605 A1 | 8/2004 |
| WO | 2005/106897 A1 | 11/2005 |

OTHER PUBLICATIONS

International Search Report of PCT/JP2007/061558, Mailing Date of Jul. 31, 2007. Notification of Transmittal of Translation of the International Preliminary Report on Patentability (Form PCT/IB/338) of International Application No. PCT/JP2007/061558 mailed Feb. 19, 2009 with Forms PCT/IB/373 and PCT/ISA/237.
Korean Office Action dated Mar. 31, 2010, issued in corresponding Korean patent Application No. 10-2008-7031998.
Chinese Office Action dated Dec. 28, 2007, issued in related Chinese Patent Application No. 2005800288535.
Chinese Office Action dated Aug. 14, 2009, issued in related Chinese Patent Application No. 2006101121901.
International Preliminary Report dated Apr. 19, 2007, issued in International Application No. PCT/JP2005/017741 (Forms PCT/IB/338 and PCT/IB/373 and PCT/ISA/237).
International Search Report dated Jan. 10, 2006, issued in International Application No. PCT/JP2005/017741.

(Continued)

*Primary Examiner* — David Sample
*Assistant Examiner* — Lawrence Ferguson
(74) *Attorney, Agent, or Firm* — Westerman, Hattori, Daniels & Adrian, LLP

(57) ABSTRACT

The transparent conductive laminate of the present invention is a transparent conductive laminate, comprising: a transparent film substrate; a transparent conductive thin film provided on one side of the transparent film substrate with a dielectric thin film interposed therebetween; and a transparent substrate bonded to another side of the transparent film substrate with a transparent pressure-sensitive adhesive layer interposed therebetween, wherein the transparent substrate comprises at least two transparent base films laminated with the transparent pressure-sensitive adhesive layer interposed therebetween, and the dielectric thin film comprises a first transparent dielectric thin film consisting of a $SiO_x$ (x is from 1.5 to less than 2) film having a relative refractive index of 1.6 to 1.9, and a second transparent dielectric thin film consisting of a $SiO_2$ film. This feature can improve the surface contact pressure durability.

9 Claims, 2 Drawing Sheets

OTHER PUBLICATIONS

Japanese Office Action dated Oct. 20, 2010, issued in related Japanese Patent Application No. 2005-273557.
Taiwan Office Action dated Aug. 22, 2008, issued in related Chinese Patent Application No. 94133872.
Taiwanese Office Action dated Nov. 27, 2009, issued in related Taiwanese Patent Application No. 095129746.
Korean Office Action dated Sep. 3, 2010, issued in corresponding Korean Patent Application No. 10-2008-7031998.
Korean Office Action dated Sep. 3, 2010, issued in corresponding Korean Patent Application No. 10-2010-7011046.
Taiwanese Office Action dated Dec. 28, 2010, issued in corresponding Taiwanese Patent Application No. 096121451.
Chinese Office Action dated Jun. 28, 2011, issued in corresponding Chinese Patent Application No. 200780027394.8.
Korean Office Action dated Aug. 31, 2011, issued in related Korean Patent Application No. 2008-7031998 with an English translation.
Korean Office Action dated Aug. 31, 2011, issued in related Korean Patent Application No. 2010-7011046 with an English translation.

* cited by examiner

[FIG.1]
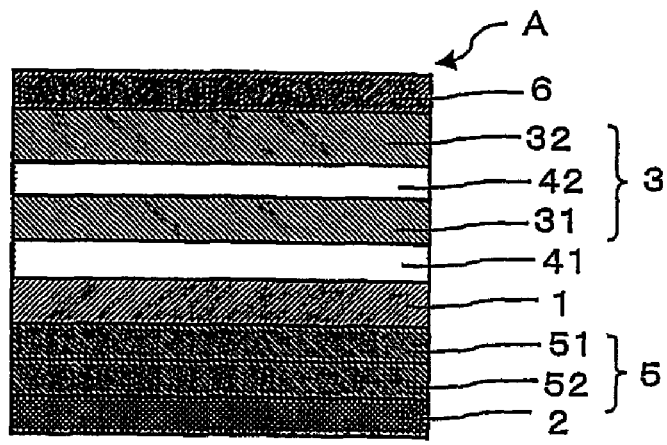
[FIG.2]
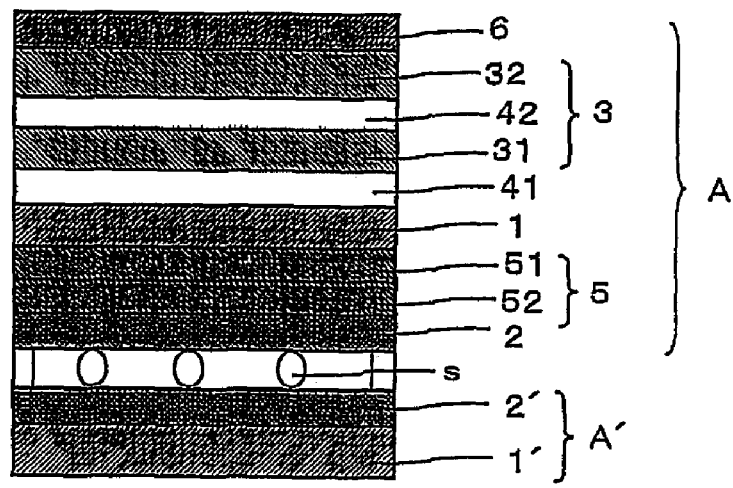
[FIG.3]
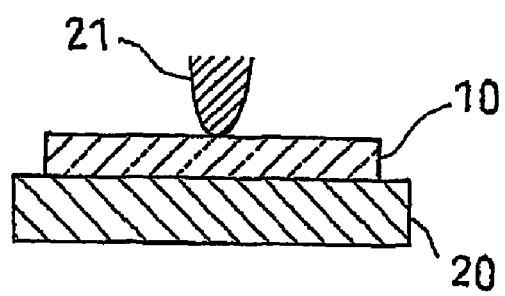

[FIG.4]
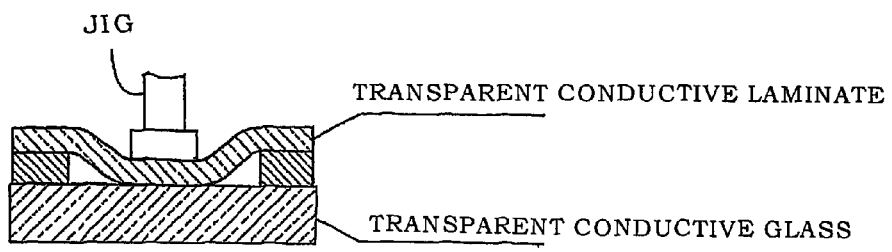
[FIG.5]
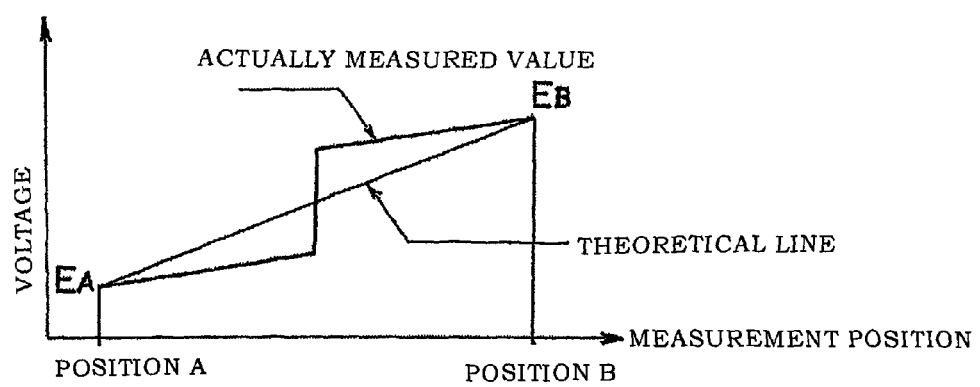

TRANSPARENT CONDUCTIVE LAMINATE AND TOUCH PANEL EQUIPPED WITH IT

TECHNICAL FIELD

The present invention relates to a transparent conductive laminate including a film substrate and a conductive thin film provided on the film substrate and having transparency in the visible light range. Also, the present invention relates to a touch panel equipped with the transparent conductive laminate. The transparent conductive laminate of the invention may be used for transparent electrodes in display systems, such as liquid crystal displays and electroluminescence displays, and touch panels, and also used for prevention of static charge of transparent products or electromagnetic wave shielding.

BACKGROUND ART

Touch panels can be classified according to the position sensing method into an optical type, an ultrasonic type, a capacitive type, a resistive film type, and the like. In particular, the resistive film type has a simple structure and thus is cost-effective so that it has come into wide use in recent years. For example, resistive film type touch panels are used for automatic teller machines (ATMs) in banks and for display panels of transportation ticket machines and the like.

The resistive film type touch panels are configured to include a transparent conductive laminate and a transparent conductive thin film-attached glass member that are opposed to each other with a spacer interposed therebetween, in which an electric current is allowed to flow through the transparent conductive laminate, while the voltage at the transparent conductive film-attached glass member is measured. When the transparent conductive laminate is brought into contact with the transparent conductive film-attached glass member by pressing with a finger, a pen or the like, the electric current flows through the contact portion so that the position of the contact portion is detected.

In recent years, the market for touch panels to be installed in smartphones, personal digital assistances (PDAs), game computers, and the like is expanding, and the frame part of touch panels becomes narrower. This increases the opportunity to push touch panels with fingers so that not only requirements for pen input durability but also requirements for surface contact pressure durability should be satisfied.

For example, it is disclosed that the touch panel includes a transparent film substrate and an anchor layer, a $SiO_x$ layer, and a transparent conductive layer that are provided on at least one side of the transparent film substrate, wherein the anchor layer is made of a resin containing at least fine particles with an average particle size of 1 to 30 nm and has a center line average roughness Ra of 4 to 20 nm (see Patent Document 1 listed below). However, this structure has the problem of lack of reliability, because the surface resistance of the transparent conductive layer is variable.

It is also disclosed that the touch panel includes a transparent conductive film in which a substrate, an anchor layer, and a conductive layer are sequentially stacked, and the anchor layer serves to anchor the conductive layer (see Patent Document 2 listed below). Patent Document 2 discloses that the anchor layer is a silica layer formed by a plasma CVD method. According to the invention described in Patent Document 2, however, durability against surface contact pressure (surface contact pressure durability) is insufficient, although it is disclosed that the invention can provide a pen-input touch panel or the like that can sufficiently withstand application of a large sliding load.

Patent Document 1: Japanese Patent Application Laid-Open (JP-A) No. 2002-117724
Patent Document 2: JP-A No. 2003-320609

DISCLOSURE OF THE INVENTION

Objects to be Achieved by the Invention

The invention has been made in view of the problems described above, and an object of the invention is to provide a transparent conductive laminate having a high level of surface contact pressure durability and to provide a touch panel including such a transparent conductive laminate.

Means for Solving the Problems

In order to solve the conventional problems described above, the inventors have made investigations on a transparent conductive laminate and a touch panel including it. As a result, it has been found that the object can be achieved using the features described below so that the invention has been completed.

Namely, the transparent conductive laminate of the present invention is a transparent conductive laminate, comprising: a transparent film substrate; a transparent conductive thin film provided on one side of the transparent film substrate with a dielectric thin film interposed therebetween; and a transparent substrate bonded to another side of the transparent film substrate with a transparent pressure-sensitive adhesive layer interposed therebetween, wherein the transparent substrate comprises at least two transparent base films laminated with the transparent pressure-sensitive adhesive layer interposed therebetween, and the dielectric thin film comprises a first transparent dielectric thin film consisting of a $SiO_x$ (x is from 1.5 to less than 2) film having a relative refractive index of 1.6 to 1.9, and a second transparent dielectric thin film consisting of a $SiO_2$ film.

In the above, it is preferable that in the dielectric thin film, the first and second transparent dielectric thin films are formed in this order from the film substrate side.

In the above, it is preferable that the first transparent dielectric thin film is formed by a dry process.

In the above, it is preferable that the first transparent dielectric thin film has a thickness of 1 to 30 nm, the second transparent dielectric thin film has a thickness of 10 to 70 nm, and the transparent conductive thin film has a thickness of 20 to 35 nm.

In the above, it is preferable that the conductive thin film comprises crystalline indium tin oxide containing more than 50% of crystals whose grain size is 200 nm or less.

In the above, it is preferable that the transparent conductive laminate further comprises a resin layer provided on an outer surface of the transparent substrate.

In the above, it is preferable that a side where the conductive thin film is laminated has a hardness of 2 GPa or more.

In the above, it is preferable that a side where the conductive thin film is laminated has an elastic modulus of 8 GPa or more.

Also, a touch panel of the present invention comprises the above transparent conductive laminate of the present invention.

EFFECTS OF THE INVENTION

In the transparent conductive laminate of the invention, a transparent laminated substrate including at least two transparent base films laminated with a transparent pressure-sensitive adhesive layer interposed therebetween is provided on the transparent conductive thin film-free side of the transparent film substrate. This feature can improve not only the pen-input durability but also the surface contact pressure durability, for example, when the transparent conductive laminate is used for touch panels.

In addition, the dielectric thin film includes a first transparent dielectric thin film of $SiO_x$ (wherein x is from 1.5 to less than 2) with a relative refractive index of 1.6 to 1.9 and a second transparent dielectric thin film of $SiO_2$. This feature also improves the surface contact pressure durability. The first transparent dielectric thin film is preferably formed by a dry process.

In the transparent conductive laminate, the surface contact pressure durability can be further improved by providing the transparent conductive thin film on the film substrate side with the dielectric thin film interposed therebetween. The formation of the dielectric thin film including the first dielectric thin film and second dielectric thin film on the film substrate side is also preferred to further improve the surface contact pressure durability.

Further, as described above, the $SiO_x$ film provided as the first transparent dielectric thin film between the film substrate and the $SiO_2$ film as the second transparent dielectric thin film can reduce the rate of change of the surface electric resistance of the conductive thin film so that a transparent conductive laminate with a high level of stability can be obtained.

Further, the thickness of the $SiO_x$ film may be set in the range of 1 to 30 nm so that the $SiO_x$ film can be stably produced in the form of a continuous coating film, while waving or curling can be reduced even under high-temperature and high-humidity conditions, and consequently, changes in reflection characteristics or transmitted hue can be reduced. In addition, the $SiO_x$ film formed by a dry process has a high level of moisture resistance or heat resistance, because moisture intrusion into the film substrate can be reduced by the dry process as compared with the case where the $SiO_x$ film is formed by a wet process including application of polysiloxane-based thermosetting resin, silica sol, or the like. As a result, waving or curling can be further reduced as compared with conventional cases. Further, the thickness of the $SiO_2$ film may be set in the range of 10 to 70 nm so that the $SiO_2$ film can be stably produced in the form of a continuous coating film, while improvements in abrasion resistance and transparency or a reduction in cracking can be achieved. Further, the thickness of the conductive thin film may also be set in the range of 20 to 35 nm so that the thin film can be stably produced in the form of a continuous coating film, and a reduction in transparency can be suppressed as well as the surface resistance can be reduced.

BRIEF DESCRIPTION OF DRAWINGS

FIG. 1 is a schematic cross-sectional view showing a transparent conductive laminate according to an embodiment of the invention;

FIG. 2 is a schematic cross-sectional view showing a touch panel according to an embodiment of the invention;

FIG. 3 is a schematic diagram to illustrate a method for measuring the hardness and the elastic modulus of the conductive thin film side of the transparent conductive laminate;

FIG. 4 is a schematic cross-sectional view to illustrate a surface contact pressure durability test for touch panels according to examples of the invention; and FIG. 5 is a graph showing the relationship between the voltage value at a touch panel obtained in Example 1 and the measurement position.

DESCRIPTION OF REFERENCE SYMBOLS

In the drawings, reference symbol 1 represents a film substrate, 2 a conductive thin film 2 a transparent laminated substrate, 31 and 32 each a base film, 41 and 42 each a pressure-sensitive adhesive layer, 5 (51, 52) a dielectric thin film, 6 a hard coat layer, A a transparent conductive laminate, and s a spacer.

BEST MODE FOR CARRYING OUT THE INVENTION

Some embodiments of the invention are described below with reference to the drawings, in which some parts unnecessary for explanation are omitted, and some parts are illustrated in an enlarged, reduced or modified form for easy understanding.

FIG. 1 is a schematic cross-sectional view showing an example of the transparent conductive laminate according to an embodiment of the invention. Specifically, in FIG. 1, a transparent conductive laminate A has a structure including a transparent film substrate 1, a transparent conductive thin film 2 provided on one side of the film substrate 1, and a transparent laminated substrate 3 bonded to the other side of the film substrate 1 with a pressure-sensitive adhesive layer 41 interposed therebetween. The transparent laminated substrate 3 includes a transparent base film 31 and another transparent base film 32 that are laminated with a transparent pressure-sensitive adhesive layer 42 interposed therebetween. While FIG. 1 illustrates a case where two transparent base films are laminated, two or more transparent base films may be laminated, and specifically three, four, five, or more transparent base films may be laminated. Such a structure can further increase in-plane durability. Further, FIG. 1 shows a case where a hard coat layer (resin layer) 6 is further provided on the outer surface of the transparent laminated substrate 3. Furthermore, as shown in FIG. 1, the transparent conductive thin film 2 is provided on one side of the film substrate 1 with a dielectric thin film 5 (including a first transparent dielectric thin film 51 and a second transparent dielectric thin film 52) interposed therebetween. FIG. 1 shows a case where the dielectric thin film 5 includes the first transparent dielectric thin film 51 and the second transparent dielectric thin film 52 that are formed in this order from the side of film substrate 1. This structure can further increase in-plane durability.

There is no particular limitation to the film substrate 1, and various types of plastic films having transparency may be used. Examples of the material for the film substrate 1 include polyester resins, acetate resins, polyethersulfone resins, polycarbonate resins, polyamide resins, polyimide resins, polyolefin resins, (meth)acrylic resins, polyvinyl chloride resins, polyvinylidene chloride resins, polystyrene resins, polyvinyl alcohol resins, polyarylate resins, and polyphenylene sulfide resins. Above all, polyester resins polycarbonate resins, and polyolefin resins are preferred.

Examples thereof also include polymer films as disclosed in JP-A No. 2001-343529 (WO10/37007) and a resin composition that contains (A) a thermoplastic resin having a substituted and/or unsubstituted imide group in the side chain and (B) a thermoplastic resin having a substituted and/or unsubstituted phenyl and nitrile groups in the side chain.

Specifically, a polymer film of a resin composition containing an alternating copolymer of isobutylene and N-methylmaleimide and an acrylonitrile-styrene copolymer may be used.

The thickness of the film substrate 1 is preferably in the range of 2 to 200 µm, more preferably in the range of 2 to 100 µm. When the thickness of the film substrate 1 is less than 2 µm, the film substrate 1 can have insufficient mechanical strength so that it can be difficult to carry out the process of continuously forming the conductive thin film 2, the dielectric thin film 5 and the pressure-sensitive adhesive layer 41 on the film substrate 1 being fed from a roll. On the other hand, when the thickness is more than 200 µm, it can be sometimes impossible to improve the abrasion resistance of the conductive thin film 2 or the tap properties thereof for touch panels based on the cushion effect of the pressure-sensitive adhesive layer 41.

The surface of the film substrate 1 may be previously subject to sputtering, corona discharge treatment, flame treatment, ultraviolet irradiation, electron beam irradiation, chemical treatment, etching treatment such as oxidation, hard coating, or undercoating treatment such that the adhesion of the transparent conductive thin film 2 or the dielectric thin film 5 formed thereon to the film substrate 1 can be improved. If necessary, the film substrate 1 may also be subjected to dust removing or cleaning by solvent cleaning, ultrasonic cleaning or the like, before the transparent conductive thin film 2 or the dielectric thin film 5 is formed.

The dielectric thin film 5 is composed of the first transparent dielectric thin film 51 and the second transparent dielectric thin film 52. In the dielectric thin film 5, the first transparent dielectric thin film 51 is preferably a $SiO_x$ film (wherein x is from 1.5 to less than 2) with a relative refractive index of 1.6 to 1.9 formed by a dry process, and the second transparent dielectric thin film 52 is preferably a $SiO_2$ film.

The dielectric thin film 5 may be formed with the materials described above by a dry process such as vacuum deposition method, sputtering method, or ion plating method, or a wet process method (coating). In general, the thickness of each layer in the dielectric thin film 5 is preferably from about 1 to 300 nm.

The $SiO_x$ film (wherein x is from 1.5 to less than 2) may be a layer formed by a dry process. Vacuum deposition, sputtering, ion plating, or the like may be used as the dry process. In-plane durability can be more improved in this case than in the case where the $SiO_x$ film is formed by a wet process in which polysiloxane thermosetting resin, silica sol or the like is applied.

The $SiO_x$ film (wherein x is from 1.5 to less than 2) is provided on the film substrate 1, because if only a $SiO_2$ film is formed as an anchor layer directly on the film substrate 1 in the case where a polyethylene terephthalate film is used as the film substrate 1, sufficient adhesion cannot be achieved. Therefore, the $SiO_x$ film is provided as the first transparent dielectric thin film 51 between the film substrate 1 and the $SiO_2$ film and used as a binder to ensure sufficient adhesion. Further, since $SiO_2$ is a low-refractive-index material, it can reduce reflectivity and consequently achieve a high level of light transmittance. Therefore, the $SiO_2$ film is particularly effective as an undercoat layer for the conductive thin film in improving in-plane durability.

The thickness of the $SiO_x$ film provided as the first transparent dielectric thin film 51 is preferably in the range of 1 to 30 nm, more preferably in the range of 1 to 15 nm. When the thickness is less than 1 nm, it may tend to be difficult to stably form the $SiO_x$ film as a continuous coating film. On the other hand, when the thickness is more than 30 nm, a change in reflection or transmitted hue can sometimes occur, for example, in an environmental reliability test or the like. This is because in the environmental reliability test, x becomes close to 2, namely $SiO_x$ gradually changes into $SiO_2$, so that the refractive index of the $SiO_x$ film changes to the range of 1.45 to 1.7. The $SiO_x$ film is also an optical thin film whose properties depend on the refractive index and the thickness of each layer. It has been found that when the thickness is 25 nm or less, the optical properties is less affected by variations in refractive index. In addition, examples of the environmental reliability test include a high temperature test at 80° C., a high-temperature, high-humidity test at 60° C. and 90% RH or at 85° C. and 85% RH, etc.

The relative refractive index of the $SiO_x$ film is in the range of 1.6 to 1.9. Within this range, in-plane durability can be improved, for example, when the transparent conductive laminate A is used for touch panels. Relative refractive indexes of less than 1.6 are not preferred in view of the in-plane durability. On the other hand, it is difficult to form a $SiO_x$ film with a relative refractive index of more than 1.9.

The thickness of the $SiO_2$ film provided as the second transparent dielectric thin film 52 is preferably in the range of 10 to 70 nm, more preferably in the range of 10 to 65 nm. The $SiO_2$ film with a thickness of less than 10 nm is difficult to form as a continuous coating film and could have insufficiently improved abrasion resistance. On the other hand, when the $SiO_2$ film with a thickness of more than 70 nm can have insufficiently improved transparency and can be cracked.

The $SiO_x$ film and the $SiO_2$ film each preferably have an average surface roughness of 0.8 to 3.0 nm. When the average surface roughness is less than 0.8 nm, the surface irregularities could be so fine that antiglare properties could be reduced. Further, when the conductive thin film 2 is made thick in such a case, the surface resistance could also be too low. On the other hand, when the average surface roughness is more than 3.0 nm, the surface irregularities could be so large that it could be difficult to achieve stable surface resistance value. In addition, the average surface roughness may refer to "surface roughness (Ra)" measured with an Atomic Force Microscope (AFM). Specifically, the average surface roughness may be a value measured with SPI3800 (manufactured by Seiko Instruments Inc.) as the AFM under the following conditions: mode, contact mode; probe, made of $Si_3N_4$ (0.09 N/m in spring constant); scan size, 1 µm square.

For example, the conductive thin film 2 is preferably made of, but not limited to, indium oxide containing tin oxide, tin oxide containing antimony, or the like. The conductive thin film 2 preferably has a crystal grain size of 200 nm or less, more preferably of 50 to 150 nm. In particular, the conductive thin film 2 is preferably made of crystalline indium tin oxide with a crystal content of more than 50%, so that a high level of surface contact pressure durability can be achieved. As the content of crystals with relatively large grain sizes increases, cracking may be more likely to occur so that surface contact pressure durability may tend to be reduced. The crystal grain size may be defined as the average of the maximum diagonals or diameters of the respective multangular-shaped or oval-shaped regions observed under a transmission electron microscope. For example, the crystal grain size may be measured by FE-TEM observation (HF-2000 manufactured by Hitachi, Ltd., with an acceleration voltage of 200 kV) or the like.

The thickness of the conductive thin film 2 is preferably in the range of 20 to 35 nm, more preferably in the range of 20 to 30 nm. When the thickness is less than 20 nm, the surface resistance could be high, and it could be difficult to form the thin film as a continuous coating film. On the other hand, when the thickness is more than 35 nm, a reduction in transparency or the like could occur.

In addition, when the conductive thin film 2 is formed on the film substrate 1 with the $SiO_x$ film as the first transparent dielectric thin film and then the $SiO_2$ film as the second transparent dielectric thin film interposed therebetween, the rate of change in surface resistance can be reduced so that the stability can be higher than that of conventional techniques.

The conductive thin film 2 may be formed by any known conventional method. Examples of such a method include vacuum deposition method, sputtering method, and ion plating method. Any appropriate method may be used depending on the desired film thickness.

The other side of the film substrate 1 provided with the conductive thin film 2, is bonded to the transparent laminated substrate 3 with the transparent pressure-sensitive adhesive layer 41 interposed therebetween. The transparent laminated substrate 3 has a composite structure comprising at least two transparent base films bonded to each other with a transparent pressure-sensitive adhesive layer. The composite structure can improve the surface contact pressure durability.

In general, a thickness of the transparent laminated substrate 3 is preferably controlled to be from 90 to 300 μm, more preferably from 100 to 250 μm. The thickness of each base film constituting the transparent laminated substrate 3 may be from 10 to 200 μm, preferably from 20 to 150 μm, and may be controlled such that the total thickness of the transparent laminated substrate 3 including these base films and the transparent pressure-sensitive adhesive layer(s) can fall within the above range. Examples of the material for the base film include those for the film substrate 1.

The film substrate 1 and the transparent laminated substrate 3 may be bonded by a process including the steps of forming the pressure-sensitive adhesive layer 41 on the transparent laminated substrate 3 side and bonding the film substrate 1 thereto or by a process including the steps of forming the pressure-sensitive adhesive layer 41 contrarily on the film substrate 1 side and bonding the transparent laminated substrate 3 thereto. The latter process is more advantageous in view of productivity, because it enables continuous production of the pressure-sensitive adhesive layer 41 with the film substrate 1 in the form of a roll. Alternatively, the transparent laminated substrate 3 may be formed on the film substrate 1 by sequentially laminating the base films 31 and 32 with the pressure-sensitive adhesive layers 41 and 42. The transparent pressure-sensitive adhesive layer (the pressure-sensitive adhesive layer 42 in FIG. 1) for use in laminating the base films may be made of the same material as the transparent pressure-sensitive adhesive layer 41 described below.

Any transparent pressure-sensitive adhesive may be used for the pressure-sensitive adhesive layer 41 without limitation. For example, the pressure-sensitive adhesive may be appropriately selected from adhesives based on polymers such as acrylic polymers, silicone polymers, polyester, polyurethane, polyamide, polyvinyl ether, vinyl acetate-vinyl chloride copolymers, modified polyolefins, epoxy polymers, fluoropolymers, and rubbers such as natural rubbers and synthetic rubbers. In particular, acrylic pressure-sensitive adhesives are preferably used, because they have good optical transparency and good weather or heat resistance and exhibit suitable wettability and adhesion properties such as cohesiveness and adhesiveness.

The anchoring strength can be improved using an appropriate pressure-sensitive adhesive primer, depending on the type of the pressure-sensitive adhesive as a material for forming the pressure-sensitive adhesive layer 41. In the case of using such a pressure-sensitive adhesive, therefore, a certain pressure-sensitive adhesive primer is preferably used.

The pressure-sensitive adhesive primer may be of any type as long as it can improve the anchoring strength of the pressure-sensitive adhesive. For example, the pressure-sensitive adhesive primer that may be used is a so-called coupling agent such as a silane coupling agent having a hydrolyzable alkoxysilyl group and a reactive functional group such as amino, vinyl, epoxy, mercapto, and chloro in the same molecule, a titanate coupling agent having an organic functional group and a titanium-containing hydrolyzable hydrophilic group in the same molecule, and an aluminate coupling agent having an organic functional group and an aluminum-containing hydrolyzable hydrophilic group in the same molecule; or a resin having an organic reactive group, such as an epoxy resin, an isocyanate resin, a urethane resin, and an ester urethane resin. In particular, a silane coupling agent-containing layer is preferred, because it is easy to handle industrially.

The pressure-sensitive adhesive layer 41 may contain a crosslinking agent depending on the base polymer. If necessary, the pressure-sensitive adhesive layer 41 may also contain appropriate additives such as natural or synthetic resins, glass fibers or beads, or fillers comprising metal powder or any other inorganic powder, pigments, colorants, and antioxidants. The pressure-sensitive adhesive layer 41 may also contain transparent fine particles so as to have light diffusing ability.

The transparent fine particles to be used may be one or more types of appropriate conductive inorganic fine particles of silica, calcium oxide, alumina, titania, zirconia, tin oxide, indium oxide, cadmium oxide, antimony oxide, or the like with an average particle size of 0.5 to 20 μm or one or more types of appropriate crosslinked or uncrosslinked organic fine particles of an appropriate polymer such as poly(methyl methacrylate) and polyurethane with an average particle size of 0.5 to 20 μm.

The pressure-sensitive adhesive layer 41 is generally formed using a pressure-sensitive adhesive solution with a solids content of about 10 to about 50% by weight, in which a base polymer or a composition thereof is dissolved or dispersed in a solvent. An organic solvent such as toluene and ethyl acetate, water, or any other solvent may be appropriately selected depending on the type of the pressure-sensitive adhesive and used as the above solvent.

After the bonding of the transparent laminated substrate 3, the pressure-sensitive adhesive layer 41 has a cushion effect and thus can function to improve the scratch resistance of the conductive thin film formed on one side of the film substrate 1 or to improve the tap properties thereof for touch panels, such as so called pen input durability and surface contact pressure durability. In terms of performing this function better, it is preferred that the elastic modulus of the pressure-sensitive adhesive layer 41 should be set in the range of 1 to 100 $N/cm^2$ and that its thickness should be set at 1 μm or more, generally in the range of 5 to 100 μm.

If the elastic modulus is less than 1 $N/cm^2$, the pressure-sensitive adhesive layer 41 can be inelastic so that the pressure-sensitive adhesive layer 41 can easily deform by pressing to make the film substrate 1 irregular and further to make the conductive thin film 2 irregular. If the elastic modulus is less than 1 $N/cm^2$, the pressure-sensitive adhesive can easily squeeze out of the cut section, and the effect of improving the scratch resistance of the conductive thin film 2 or improving the tap properties of the thin film 2 for touch panels can be reduced. If the elastic modulus is more than 100 $N/cm^2$, the pressure-sensitive adhesive layer 41 can be hard, and the cushion effect cannot be expected, so that the scratch resistance of the conductive thin film 2 or the pen input durability and surface contact pressure durability of the thin film 2 for touch panels can tend to be difficult to improve.

If the thickness of the pressure-sensitive adhesive layer 41 is less than 1 µm, the cushion effect also cannot be expected so that the scratch resistance of the conductive thin film 2 or the pen input durability and surface contact pressure durability of the thin film 2 for touch panels can tend to be difficult to improve. If it is too thick, it can reduce the transparency, or it can be difficult to obtain good results on the formation of the pressure-sensitive adhesive layer 41, the bonding workability of the transparent laminated substrate 3, and the cost.

The transparent laminated substrate 3 bonded through the pressure-sensitive adhesive layer 41 as described above imparts good mechanical strength to the film substrate 1 and contributes to not only the pen input durability and the surface contact pressure durability but also the prevention of curling.

The pressure-sensitive adhesive layer 41 may be transferred using a separator. In such a case, for example, the separator to be used may be a laminate of a polyester film of a migration-preventing layer and/or a release layer, which is provided on a polyester film side to be bonded to the pressure-sensitive adhesive layer 41.

The total thickness of the separator is preferably 30 µm or more, more preferably in the range of 75 to 100 µm. This is to prevent deformation (dents) of the pressure-sensitive adhesive layer 41 in a case where the pressure-sensitive adhesive layer 41 is formed and then stored in the form of a roll, in which the deformation (dents) would be expected to occur due to foreign particles or the like intruding between portions of the rolled layer.

The migration-preventing layer may be made of an appropriate material for preventing migration of migrant components in the polyester film, particularly for preventing migration of low molecular weight oligomer components in the polyester. An inorganic or organic material or a composite thereof may be used to form the migration-preventing layer. The thickness of the migration-preventing layer may be set in the range of 0.01 to 20 µm as needed. The method of forming the migration-preventing layer, is not particularly limited, but for example, includes coating method, spraying method, spin coating method, or in-line coating method. Further, Vacuum deposition method, sputtering method, ion plating method, spray thermal decomposition method, chemical plating method, electroplating method, or the like may also be used.

The mold release layer may be made of an appropriate release agent such as a silicone-based mold release agent, a long-chain alkyl-based mold release agent, a fluorochemical-based mold release agent, or molybdenum sulfide. The thickness of the release layer may be set as appropriate in view of the release effect. In general, the thickness is preferably 20 µm or less, more preferably in the range of 0.01 to 10 µm, particularly preferably in the range of 0.1 to 5 µm, in view of handleability such as flexibility.

An ionizing radiation cured resin such as an acrylic resin, a urethane-based resin, a melamine-based resin, or an epoxy-based resin or a mixture of any of the above resins and aluminum oxide, silicon dioxide, mica, or the like may be used in the coating method, spraying method, spin coating method, or in-line coating method. Further, when the vacuum deposition method, sputtering method, ion plating method, spray thermal decomposition method, chemical plating method, or electroplating method is used, an oxide of a metal such as gold, silver, platinum, palladium, copper, aluminum, nickel, chromium, titanium, iron, cobalt, or tin, an oxide of an alloy thereof, or any other metal compounds such as metal iodides may be used.

If necessary, an antiglare or antireflection layer for improving visibility or a hard coat layer (resin layer) 6 for protecting the outer surface may be formed on the outer surface of the transparent laminated substrate 3 (on the side opposite to the pressure-sensitive adhesive layer 41). The antiglare layer or the antireflection layer may also be formed on the hard coat layer 6 provided on the transparent laminated substrate 3. For example, the hard coat layer 6 is preferably made of a cured coating film of a cured resin such as a melamine resin, a urethane-based resin, an alkyd-based resin, an acrylic resin, or a silicone-based resin.

For example, the material to be used to form the antiglare layer may be, but not limited to, an ionizing radiation cured resin, a thermosetting resin, a thermoplastic resin, or the like. The thickness of the antiglare layer is preferably from 0.1 to 30 µm. When the thickness is less than 0.1 µm, there may be a risk of insufficient hardness. On the other hand, when the thickness is more than 30 µm, the antiglare layer can be cracked in some cases, or the whole of the transparent laminated substrate 3 coated with the antiglare layer can curl in some cases.

The antireflection layer may be formed on the hard coat layer 6. Light incident on an object undergoes reflection on the interface, absorption and scattering in the interior, and any other phenomena until it reaches the backside through the object. Light reflection at the interface between air and the transparent laminated substrate 3 or the hard coat layer 6 is one of the factors behind the reduction in visibility of the image on a display equipped with a touch panel. A method for reducing the surface reflection includes placing a thin film with strictly controlled thickness and refractive index on the surface of the hard coat layer 6 so that an antireflection function can be produced by allowing opposite phases of incident light and reflected light to cancel each other out based on interference of light.

When the antireflection layer is designed based on interference effect of light, the interference effect can be enhanced by increasing the difference between the refractive indexes of the antireflection layer and the hard coat layer 6. In general, two to five optical thin films (each with strictly controlled thickness and refractive index) may be stacked on the substrate to form an antireflection multilayer. In such a case, components of different refractive indexes are generally used to form a plurality of layers with a certain thickness, so that the antireflection layer can be optically designed at a higher degree of freedom, the antireflection effect can be enhanced, and it may be possible to make the spectral reflection characteristics flat over the visible light range. Since each layer of the optical thin film is required to be precise in thickness, a dry process such as vacuum deposition method, sputtering method, or CVD method is generally used to form each layer.

The antireflection layer may use titanium oxide, zirconium oxide, silicon oxide, magnesium fluoride, or the like. In order to produce a more significant antireflection function, a laminate of a titanium oxide layer(s) and a silicon oxide layer(s) is preferably used. Such a laminate is preferably a two-layer laminate including a high-refractive-index titanium oxide layer (refractive index: about 1.8), which is formed on the hard coat layer 6, and a low-refractive-index silicon oxide layer (refractive index: about 1.45), which is formed on the titanium oxide layer. Also preferred is a four-layer laminate including the two-layer laminate and a titanium oxide layer and a silicon oxide layer formed in this order on the two-layer laminate. The antireflection layer of such a two-layer or four-layer laminate can evenly reduce reflection over the visible light wavelength range (380 to 780 nm).

The antireflection effect may also be produced by placing a monolayer optical thin film on the transparent laminated substrate 3 or the hard coat layer 6. In the design of a single antireflection layer, the difference between the refractive indexes of the antireflection layer and the hard coat layer 6 should be so large as to produce a maximum antireflection function. Concerning the thickness (d) and refractive index (n) of the antireflection layer and the wavelength (λ) of incident light, the relation nd=λ/4 can be established. When the refractive index of the antireflection layer is lower than that of the substrate, its reflectivity can be minimal under the conditions that the relation is established. For example, when the refractive index of the antireflection layer is 1.45, the antireflection layer with a thickness of 95 nm can have a minimum reflectivity at a wavelength of 550 nm with respect to an incident beam of visible light.

The antireflection function should be produced in the visible light wavelength range of 380 to 780 nm, and the visibility is particularly high in the wavelength range of 450 to 650 nm. The antireflection layer is generally designed to have a minimum reflectivity at 550 nm, the center wavelength of the range.

In the design of a single antireflection layer, its thickness accuracy may be less strict than that of the antireflection multilayer and may be in the range of ±10% with respect to the design thickness. Specifically, when the design thickness is 95 nm, therefore, the layer with a thickness in the range of 86 nm to 105 nm can be used with no problem. Thus, the monolayer antireflection film is generally formed using a wet process such as fountain coating, die coating, spin coating, spray coating, gravure coating, roll coating, or bar coating.

For example, the hard coat layer 6 is preferably made of a cured coating film of a cured resin such as a melanine resin, a urethane-based resin, an alkyd-based resin, an acrylic resin, or a silicone-based resin. Further, the thickness of the hard coat layer 6 is preferably from 0.1 to 30 μm. When the thickness is less than 0.1 μm, its hardness can be insufficient in some cases. When the thickness is more than 30 μm, the hard coat layer 6 can be cracked in some cases, or the whole of the transparent laminated substrate 3 can curl in some cases.

The transparent conductive laminate A shown in FIG. 1 may be annealed in the range of 100 to 150° C., when a touch panel is manufactured or as needed. Therefore, the transparent conductive laminate A preferably has heat resistance at 100° C. or higher, more preferably at 150° C. or higher.

Concerning the physical properties of the transparent conductive laminate A at the side of the conductive thin film 2, the hardness at the side of the conductive thin film is preferably 2 GPa or more, particularly preferably 3 GPa or more, and the elastic modulus at the side of the conductive thin film 2 is preferably 8 GPa or more, particularly preferably 10 GPa or more. The transparent conductive laminate A having such physical properties is prevented from suffering from cracking in the conductive thin film 2, prevented from suffering from degradation in electric resistance, or prevented from suffering from other troubles, even when bent. Therefore, the transparent conductive laminate A has high bending resistance and is suitable for use as a substrate in the field of optoelectronics such as touch panels. In view of crack resistance, the hardness at the side of the conductive thin film 2 preferably has an upper limit of 5 GPa or less, more preferably of 4 GPa or less. Also in view of crack resistance, the elastic modulus at the side of the conductive thin film 2 preferably has an upper limit of 20 GPa or less, more preferably of 16 GPa or less.

For example, the hardness and the elastic modulus of the conductive thin film 2 side may be measured with a scanning probe microscope (such as JSPM-4200, JEOL Ltd.) or the like by an indentation test (indenter indentation test) (see FIG. 3). In the measurement of the hardness of thin films, the indenter indentation depth is generally required to be about one-tenth or less of the film thickness.

The indentation test includes fixing a test piece (namely the conductive thin film 2 side of the transparent conductive laminate A) on a sample stage 20 and pressing an indenter 21 into a substantially central portion of the test piece with a load applied thereto in that state when an indentation curve (a load-indentation depth curve) is obtained. In this process, the hardness H of the test piece is calculated from the ratio of the maximum load Pmax to the projected contact area A between the indenter 21 and the test piece according to formula (1) below. The composite elastic modulus Er of the test piece is calculated from the initial gradient S of the unloading curve of the indentation curve according to formula (2) below. In addition, the Young's modulus Es of the test piece is further calculated from the Young's modulus Ei of the indenter 21, the Poisson's ratio vi of the indenter 21, and the Poisson's ratio vs of the test piece according to formula (3) below.

In formula (2) below, β is a constant. The indenter is made of diamond, which has a Young's modulus Ei of 1,140 GPa and a Poisson's ratio of 0.07.

[formula 1]

$$H = P\max/A \quad (1)$$

$$S = (2/\sqrt{\pi}) \times Er \times \beta \times \sqrt{A} \quad (2)$$

$$Er = 1/\{(1-vs2)/Es + (1-vi2)/Ei\} \quad (3)$$

Since the Poisson's ratio vs of the conductive thin film (the test piece) is unknown, the composite elastic modulus Er may be defined as the elastic modulus according to the invention. The measurement may be performed by known methods such as those described in detail in W. C. Oliver and G. M. Phar, J. Meter. Res., Vol. 7, No. 6, June 1992, and Handbook of Micro/Nanotribology.

Next, a touch panel according to an embodiment of the invention is described below. FIG. 2 is a schematic cross-sectional view schematically showing a touch panel according to an embodiment of the invention. Referring to the drawing, the touch panel is configured to include the transparent conductive laminate A and a lower substrate A' that are arranged opposite to each other with spacers s interposed therebetween.

The lower substrate A' is configured as a laminate that includes another transparent substrate 1' and another conductive thin film 2' placed thereon. However, the structure is not intended to limit the scope of the invention, and, for example, the transparent conductive laminate A may also be used as the lower substrate A'. Basically, a glass plate or the same material as the transparent laminated substrate 3 may be used to form the transparent substrate 1'. The thickness and other properties of the transparent substrate 1' may also be the same as those of the transparent laminated substrate 3. Basically, the same material as the conductive thin film 2 may be used to form the conductive thin film 2'. The thickness and other properties of the conductive thin film 2' may also be the same as those of the conductive thin film 2.

The spacers s may be of any insulating type, and various known spacers may be used. There is no particular limitation to the method for production of the spacers s, or the size, position, or number of the spacers s. The spacers s may have any known shape such as a substantially spherical shape or a multangular shape.

The touch panel shown in FIG. 2 functions as a transparent switch substrate in which contact between the conductive thin films 2 and 2' upon tapping with an input pen or the like on the transparent conductive laminate A side against the elastic force of the spacers s produces the electrically ON state, while removal of the press turns it to the original OFF state. In this mechanism, the conductive thin film 2 of the touch panel has a high level of abrasion resistance, pen-input durability, surface contact pressure durability, and so on, so that the function described above can be stably maintained over a long period of time.

EXAMPLES

The invention is more specifically described with some examples below. It will be understood that the invention is not limited to the examples below without departing from the gist of the invention. In each example, the term "part or parts" means part or parts by weight, unless otherwise stated.

Example 1

Formation of Dielectric Thin Films

A $SiO_x$ film (1.80 in relative refractive index, 15 nm in thickness) was formed by vacuum deposition on one side of a film substrate made of a 25 μm-thick polyethylene terephthalate film (hereinafter referred to as "PET film"). A $SiO_2$ film (1.46 in relative refractive index, 30 nm in thickness) was then formed on the $SiO_x$ film by vacuum deposition.

Formation of Conductive Thin Film

A 25 nm-thick ITO film (a conductive thin film, 2.00 in relative refractive index) was then formed on the $SiO_2$ film by reactive sputtering method using a sintered material composed of 95% by weight of indium oxide and 5% by weight of tin oxide in a 0.4 Pa atmosphere composed of 95% of argon gas and 5% of oxygen gas. The ITO film was crystallized by heat treatment at 150° C. for 1 hour.

Formation of Hard Coat Layer

A toluene solution as a material for forming a hard coat layer was prepared by adding 5 parts of hydroxycyclohexyl phenyl ketone (Irgacure 184, manufactured by Ciba Specialty Chemicals Inc.) as a photopolymerization initiator to 100 parts of an acrylic urethane resin (Unidic 17-806, manufactured by Dainippon Ink and Chemicals, Incorporated) and diluting the mixture with toluene to a concentration of 30% by weight.

The hard coat layer-forming material was applied to one side of a base film made of a 125 μm-thick PET film and dried at 100° C. for 3 minutes. The coating was then immediately irradiated with ultraviolet light from two ozone-type high-pressure mercury lamps (each 80 W/cm² in energy density, 15 cm focused radiation) to form a 5 μm-thick hard coat layer.

Preparation of Transparent Laminated Substrate

An about 20 μm-thick transparent acrylic pressure-sensitive adhesive layer with an elastic modulus of 10 N/cm² was formed on the other side of the base film opposite to the hard coat layer-receiving side. The pressure-sensitive adhesive layer was formed using a composition prepared by adding one part of an isocyanate crosslinking agent to 100 parts of an acrylic copolymer of butyl acrylate, acrylic acid and vinyl acetate (100:2:5 in weight ratio). Another base film made of a 25 μm-thick PET film was bonded to the pressure-sensitive adhesive layer side so that a transparent laminated substrate including the two PET films was obtained.

Preparation of Transparent Conductive Laminate

Under the same conditions as described above, a pressure-sensitive adhesive layer was formed on the other side of the transparent laminated substrate opposite to the hard coat layer-receiving side, and the pressure-sensitive adhesive layer side was bonded to the film substrate (on the side where no conductive thin film was formed) so that a transparent conductive laminate according to this example was prepared.

Example 2

Formation of Dielectric Thin Film

A 200 nm-thick dielectric thin film of an organic material was formed on one side of a film substrate made of a 25 μm-thick PET film. The dielectric thin film was a cured coating film (with a relative refractive index n of 1.54) of a thermosetting resin composed of a melamine resin, an alkyd resin, and an organosilane condensate (2:2:1 in weight ratio).

A wet $SiO_2$ film was formed on the dielectric thin film by a silica coating method. Specifically, a silica sol (Colcoat P, manufactured by Colcoat Co., Ltd.) was diluted with ethanol to a solid concentration of 2% and then applied to the dielectric thin film. The coating was dried at 150° C. for 2 minutes and then cured to form a 30 nm-thick wet $SiO_2$ film (with a relative refractive index of 1.46).

Preparation of Transparent Conductive Laminate

A transparent conductive laminate was prepared using the process of Example 1, except that the process described above in the section "Formation of Dielectric Thin Film" was performed.

Example 3

Formation of Dielectric Thin Film

A dielectric thin film was formed using the process of Example 2, except that the thickness of the dielectric thin film made of the organic material was 35 nm and that the wet $SiO_2$ film was not formed.

Preparation of Transparent Conductive Laminate

A transparent conductive laminate was prepared using the process of Example 2, except that the process described above in the section "Formation of Dielectric Thin Film" was performed.

Example 4

Formation of Dielectric Thin Film

A dielectric thin film was formed using the process of Example 1, except that the thickness of the $SiO_2$ was 60 μM.

Preparation of Transparent Conductive Laminate

A transparent conductive laminate was prepared using the process of Example 1, except that the process described above in the section "Formation of Dielectric Thin Film" was performed.

Example 5

Formation of Dielectric Thin Film

A dielectric thin film was formed using the process of Example 2, except that the thickness of the dielectric thin film made of the organic material was 150 μm.

Preparation of Transparent Conductive Laminate

A transparent conductive laminate was prepared using the process of Example 2, except that the process described above in the section "Formation of Dielectric Thin Film" was performed.

Comparative Example 1

A transparent conductive laminate was prepared using the process of Example 2, except that a transparent substrate composed of a 125 μm-thick PET film and a hard coat layer formed thereon (without the 25 μm-thick PET film bonded in the transparent laminated substrate of Example 1) was used in place of the transparent laminated substrate.

Comparative Example 2

A transparent conductive laminate was prepared using the process of Example 3, except that a transparent substrate composed of a 125 μm-thick PET film and a hard coat layer formed thereon (without the 25 μm-thick PET film bonded in the transparent laminated substrate of Example 1) was used in place of the transparent laminated substrate.

Preparation of Touch Panels

The transparent conductive laminate obtained in each of the examples and the comparative examples was used as one of the panel plates. A transparent conductive glass plate composed of a glass plate and a 30 nm-thick ITO thin film formed thereon by the same method as described above was used as the other panel plate (lower substrate). Both panel plates were arranged opposite to each other with 10 μm spacers placed therebetween in such a manner that the ITO thin films were opposite to each other, so that a touch panel to serve as a switch structure was prepared for each example. The ITO thin films of both panel plates were previously provided with silver electrodes orthogonal to each other, respectively, before they were arranged opposite to each other.

Refractive Index

The refractive indexes of the $SiO_x$ film, the $SiO_2$ film, the ITO film, and so on were measured with an Abbe refractometer manufactured by Atago Co., Ltd. according to the measurement method specified for the refractometer, while a measurement light beam was applied to the surface of each object being measured.

Thickness of Each Layer

The thicknesses of the layers each with a thickness of 1 μm or more, such as the film substrate, the base film, the hard coat layer, and the pressure-sensitive adhesive layer, were measured with a microgauge type thickness gauge manufactured by Mitutoyo Corporation. The thicknesses of the layers whose thickness were difficult to directly measure, such as the hard coat layer and the pressure-sensitive adhesive layer, were each calculated by subtracting the thickness of the substrate from the measured total thickness of the substrate and each layer formed thereon.

The thicknesses of the $SiO_x$ film, the $SiO_2$ film, the ITO film, and so on were each calculated using an instantaneous multichannel photodetector system MCPD-2000 (trade name) manufactured by Otsuka Electronics Co., Ltd., based on the waveform data of the resulting interference spectrum.

Hardness and Elastic Modulus of Conductive Thin Film Side

The hardness and the elastic modulus of the conductive thin film side were measured by the method of the indentation test described in detail above. Specifically, as shown in FIG. 3, a standard sample (fused silica) was fixed on a sample stage, and in that state, an indenter was pressed into a substantially central portion of the standard sample, while a load was applied in the vertical direction. The relation between hc and A was expressed by the formula below, wherein hc was the maximum indentation depth during the contact of the indenter with the standard sample, and A was the projected contact area.

$$A=24.5hc^2=C_0hc^2+C_1hc+C_2hc^{1/2}+C_3hc^{1/4}+C_4hc^{1/8}+C_5hc^{1/10}$$ [formula 2]

In addition, $C_0$ to $C_5$ were calculated using the formulae (1) to (3). For the calculation, the indentation with the indenter (indenter pressing) was performed once for 3 seconds under each of six loads 20 N, 50 N, 80 N, 100 N, 150 N, and 200 N in the vertical direction. The measurement was performed five times per sample, and the average was calculated. A sufficient distance was kept between the measured portions so that the indentation trace would not affect each of the measurements. For each load, the calculation was performed in such a manner that the hardness H and the elastic modulus Er could reach 10 GPa and 70 GPa, respectively.

The transparent conductive laminate obtained in each of the examples and the comparative examples was then used as a test piece, and its hardness and elastic modulus were measured. The test piece was fixed on the sample stage in such a manner that the conductive thin film (ITO thin film) was placed on the upper side. In the fixed state, the indentation with the indenter (indenter pressing) was performed one for 3 seconds on the substantially central portion of the conductive thin film side under a load of 20 μON in the vertical direction. The measurement was performed five times per sample, and the average was calculated.

Surface Resistance

The surface resistance (Ω/square) of the ITO film in each tough panel was measured using a two-terminal method.

Light Transmittance

Visible light transmittance was measured at a light wavelength of 550 nm using a spectrophotometer UV-240 manufactured by Shimadzu Corporation.

Surface Pressure Durability

As shown in FIG. 4, a surface contact pressure durability test tool (20 mmϕ in contact diameter) was pressed against each touch panel under a load of 2 kg (the coefficient of friction was from 0.7 to 1.3 when the tool was in contact with the touch panel), while the tool was allowed to slide on each touch panel. After the sliding under specific conditions, linearity was measured for an evaluation of surface contact pressure durability. The sliding was performed on the transparent conductive laminate side in an area at least 5 mm distant from the periphery of the touch panel. The sliding was performed under the conditions of 100 times of sliding and a touch panel gap of 100 μm.

The linearity was measured as described below. Specifically, a voltage of 5 V was applied to the transparent conductive laminate, and the linearity was obtained by the method below using the output voltage $E_A$ at the measurement start point A, the output voltage $E_B$ at the measurement end point B, the output voltage $E_X$ at the measurement point, and the theoretical value $E_{XX}$.

Specifically, after the sliding on each touch panel, a voltage of 5 V was applied to the transparent conductive laminate, and the linearity was obtained by the calculation using the output voltage $E_A$ at the measurement start point A, the output voltage $E_B$ at the measurement end point B, the output voltage $E_X$ at the measurement point, and the theoretical value $E_{XX}$ according to the mathematical expressions below. FIG. 5 is a graph showing the relationship between the voltage value at the touch panel obtained in example 1 and the measurement point. In the graph, the solid line indicates actual measurement values, and the dotted line indicates theoretical values. The surface contact pressure durability was evaluated from the resulting linearity value. The results are shown in table 1.

$$E_{XX}(\text{theoretical value})=\times(E_B-E_A)/(B-A)+E_A$$

$$\text{Linearity (\%)}=\{(E_{XX}-E_X)/(E_B-E_A)\}\times 100$$

TABLE 1

| | Transparent Substrate | | | | | | | Surface |
|---|---|---|---|---|---|---|---|---|
| | Number of Laminated Base Films | Total Thickness (μm) | Thin Film Composition (thickness (nm)) | Hardness (GPa) | Elastic Modulus (GPa) | Surface Resistance (Ω/square) | Visible Light Transmittance (%) | contact pressure durability (%) |
| Example 1 | 2 | 170 | ITO (25 nm)/Vapor-Deposited $SiO_2$ (30 nm)/Vapor-Deposited $SiO_x$ (15 nm) | 3.8 | 12.5 | 300 | 90 | 2.0 |
| Example 2 | 2 | 170 | ITO (25 nm)/Wet $SiO_2$ (30 nm)/Organic Layer (200 nm) | 1.5 | 6.0 | 300 | 90 | 2.5 |
| Example 3 | 2 | 170 | ITO (25 nm)/Organic Layer (35 nm) | 0.8 | 5.2 | 300 | 89 | 4.0 |
| Example 4 | 2 | 170 | ITO (25 nm)/Vapor-Deposited $SiO_2$ (60 nm)/Vapor-Deposited $SiO_x$ (15 nm) | 4.1 | 12.7 | 300 | 90 | 1.8 |
| Example 5 | 2 | 170 | ITO (25 nm)/Wet $SiO_2$ (30 nm)/Organic Layer (150 nm) | 2.9 | 12.4 | 300 | 89 | 2.2 |
| Comparative Example 1 | 1 | 125 | ITO (25 nm)/Wet $SiO_2$ (30 nm)/Organic Layer (200 nm) | 1.5 | 6.0 | 300 | 90 | 6.5 |
| Comparative Example 2 | 1 | 125 | ITO (25 nm)/Organic Layer (35 nm) | 0.8 | 5.2 | 300 | 89 | 8.0 |

Results

Table 1 clearly shows that the touch panels obtained in the examples have a high level of surface contact pressure durability. The surface contact pressure durability can be particularly improved using a specific dielectric thin film as shown in Example 1.

The invention claimed is:

1. A transparent conductive laminate, comprising:
   a transparent film substrate;
   a transparent conductive thin film provided on one side of the transparent film substrate with a dielectric thin film interposed therebetween; and
   a transparent substrate bonded to another side of the transparent film substrate with a transparent pressure-sensitive adhesive layer interposed therebetween, wherein
   the transparent substrate comprises at least two transparent base films laminated with another transparent pressure-sensitive adhesive layer interposed therebetween, and
   the dielectric thin film comprises a first transparent dielectric thin film consisting of a $SiO_x$ (x is from 1.5 to less than 2) film having a relative refractive index of 1.6 to 1.9, and a second transparent dielectric thin film consisting of a $SiO_2$ film.

2. The transparent conductive laminate according to claim 1, wherein in the dielectric thin film, the first and second transparent dielectric thin films are formed in this order from the film substrate side.

3. The transparent conductive laminate according to claim 1, wherein the first transparent dielectric thin film is formed by a dry process.

4. The transparent conductive laminate according to claim 1, wherein the first transparent dielectric thin film has a thickness of 1 to 30 nm, the second transparent dielectric thin film has a thickness of 10 to 70 nm, and the transparent conductive thin film has a thickness of 20 to 35 nm.

5. The transparent conductive laminate according to claim 1, wherein the conductive thin film comprises crystalline indium tin oxide containing more than 50% of crystals whose grain size is 200 nm or less.

6. The transparent conductive laminate according to claim 1, further comprising a resin layer provided on an outer surface of the transparent substrate.

7. The transparent conductive laminate according to claim 1, wherein a side where the conductive thin film is laminated has a hardness of 2 GPa or more.

8. The transparent conductive laminate according to claim 1, wherein a side where the conductive thin film is laminated has an elastic modulus of 8 GPa or more.

9. A touch panel, comprising the transparent conductive laminate according to claim 1.

* * * * *